United States Patent
Amirghodsi (10) Patent No.: US 7,437,018 B1
(45) Date of Patent: Oct. 14, 2008

(54) IMAGE RESAMPLING USING VARIABLE QUANTIZATION BINS

(75) Inventor: Sohrab Amirghodsi, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 762 days.

(21) Appl. No.: 10/714,514

(22) Filed: Nov. 14, 2003

Related U.S. Application Data (60) Provisional application No. 60/506,250, filed on Sep. 26, 2003, provisional application No. 60/506,249, filed on Sep. 26, 2003.

(51) Int. Cl.
*G06K 9/32* (2006.01)
*G09G 5/00* (2006.01)
*H04N 9/74* (2006.01)

(52) U.S. Cl. .................. 382/293; 345/619; 348/580

(58) Field of Classification Search ............ 382/284, 382/260, 293–296, 298–300; 345/660–671
See application file for complete search history.

(56) References Cited

U.S. PATENT DOCUMENTS

| | | | | |
|---|---|---|---|---|
| 6,111,566 A | * | 8/2000 | Chiba et al. ............... | 345/555 |
| 6,181,834 B1 | * | 1/2001 | Li et al. ................... | 382/298 |
| 6,681,059 B1 | * | 1/2004 | Thompson ................. | 382/298 |
| 6,886,034 B2 | * | 4/2005 | Blumberg ................. | 709/217 |
| 2003/0058216 A1 | * | 3/2003 | Lacroix et al. ............ | 345/156 |
| 2003/0077000 A1 | * | 4/2003 | Blinn et al. ............... | 382/260 |
| 2004/0057634 A1 | * | 3/2004 | Mutoh ..................... | 382/298 |

OTHER PUBLICATIONS

Chiang et al., "The Integrating Resampler and Efficient Image Warping", *DARPA Image Understanding Proceeding*, 7 pages (1996).
Mitchell et al., "Reconstruction Filters in Computer Graphics", *Computer Graphics*, vol. 22:4, pp. 221-226 (1988).
Ward et al., "Resampling Algorithms for Image Resizing and Rotation", *SPIE*, vol. 1075, pp. 260-268 (1989).
Wolberg, George, "Digital Image Warping", *IEEE Computer Graphics and Applications*, vol. 6:1, pp. 150-161 (1986).
Schumacher, Dale, "General Filtered Image Rescaling", in Graphics-Gems III, D.B. Kirk(ed), pp. 8-16 (1992).

* cited by examiner

*Primary Examiner*—Matthew C. Bella
*Assistant Examiner*—Randolph Chu
(74) *Attorney, Agent, or Firm*—Fish & Richardson P.C.

(57) ABSTRACT

An approach to resampling a first image that is sampled on a first sample grid. A filter for applying to the first image is computed. This involves computing a spatially quantized representation of the filter for which a degree of spatial quantization of the filter depends on factors including a measure of scale relating the first sample grid and a desired sample grid. The measure of scale can be computed based on a geometric transformation relating the first sample grid and the desired sample. The filter can be computed by selecting the number of spatial samples of the spatially quantized representation of the filter.

64 Claims, 6 Drawing Sheets

IMAGE RESAMPLING USING VARIABLE QUANTIZATION BINS

CROSS-REFERENCE TO RELATED APPLICATIONS

This application claims the benefit of U.S. Provisional Application Ser. No. 60/506,250, filed Sep. 26, 2003, and of U.S. Provisional Application Ser. No. 60/506,249, filed Sep. 26, 2003. Both of these application are incorporated herein by reference. This application is also related to concurrently filed U.S. application Ser. No. 10/714,513 titled "IMAGE RESAMPLING WITH GEOMETRIC TRANSFORMATION," which is incorporated herein by reference.

BACKGROUND

This invention relates to resampling of images.

Images are typically represented in digital form as raster images in which a rectangular grid of pixels values define the image. These pixel values can be thought of as samples of a continuous two-dimensional image at the coordinates of the pixels in the rectangular grid. Changing the array of pixel locations, or scaling the image while keeping the pixel locations fixed, involves computing new pixel values. This process of computing the new pixel values is referred to as resampling the image.

In general, resampling an image with an increased number of pixels involves interpolating image values at locations between the original pixel locations. Similarly, scaling up (magnification of) the image for a fixed grid of pixel locations involves interpolating image values. On the other hand, sampling an image with fewer pixels involves a loss of spatial resolution that is generally handled by spatially low-pass filtering (anti-alias filtering) the image prior to or in the process of determining the new pixel values. Both interpolation and low-pass filtering can be implemented by computing a filtered version of the originally spatially sampled image at the new desired pixel locations.

One technique for increasing the efficiency of the resampling process is to pre-compute a spatially quantized ("binned") representation of the interpolation/low-pass filter. For example, a fixed number of bins per unit pixel spacing are used. Computing a new pixel value then involves using the appropriate bins when combining the filter and the original pixel values.

In some software applications, a user has control over the type of filter that is used in the resampling. For example, in some applications, the user can choose between a "linear" and a "cubic" filter. The choice has implications for the resulting image quality as well as the computation required to perform the resampling.

SUMMARY

In one aspect, in general, the invention features a method and a corresponding system and software for resampling a first image that is sampled on a first sample grid. A filter for applying to the first image is first computed. This involves computing a spatially quantized representation of the filter for which a degree of spatial quantization of the filter depends on factors including a measure of scale relating the first sample grid and a desired sample grid.

Aspects of the invention may include one or more of the following features.

A desired image sampled on the desired sample grid is computed by computing samples of the desired image according to an application of the spatially quantized representation of the filter to the first image.

Data is accepted characterizing a geometric transformation relating the first sample grid and the desired sample.

The measure of scale is computed from the data characterizing the geometric transformation.

The filter is computed by selecting the number of spatial samples of the spatially quantized representation of the filter. Computing the spatially quantized representation of the filter can then include computing values of the filter each associated with one of a number of equally-sized spatial domains of the filter.

The filter for applying to the first image is computed by selecting a parametric family of filters, and can include determining parameter values for the filter. These parameter values can be computed based on factors including the measure of scale.

The data characterizing the geometric transformation includes data characterizing an affine transformation.

The data characterizing the geometric transformation can include a magnification factor or a minification factor.

A user input specifying a characteristic of the resampling is accepted and is used in the computing of the filter for applying to the first image. The user include can include an input related to a characteristic of the desired image, such as a visual characteristic of the desired image. Such visual characteristic can be related to a degree of sharpness of the resampled image. The user input can also relate to a processing characteristic for the resampling, such as an input related to a processing speed.

The degree of spatial quantization of the filter depends on factors that include characteristics of a computation device for performing the resampling. Such characteristics of the computational device can include a memory size characteristic, such as a cache memory size. The characteristics can also include a processor characteristic.

In another aspect, in general, the invention features a method and a corresponding system and software for resampling a first image. Data characterizing a geometric transformation relating the first sample grid and the desired sample grid are accepted, and a measure of scale relating the first sample grid and a desired sample grid is determined from the accepted data. A filter for applying to the first image is computed by selecting characteristics of the filter according to the determined measure of scale.

In another aspect, in general, the invention features a method and a corresponding system and software for resampling a first image. A user input specifying a characteristic of a desired resampled image is accepted, and a filter for applying to the first image is computed as part of computing the desired resampled image. Computing the filter includes selecting characteristics of the filter according to the accepted user input.

Aspects of the invention can include one or more of the following advantages.

The approach can provide improved quality of resampled images at a range of scale factors. Image characteristics such as the sharpness of the resampled image may be adjusted depending of the scale factor of the resampling. Such adjustment can be used to avoid a resampled image appearing either too sharp or too smooth. For example, a desirable sharpness for a thumbnail image for presentation on a computer screen or on a LCD display on a portable device such as a camera may be different that a desirable sharpness on a scaled-up image presented by an image-editing software application. Furthermore, even for the same scale factor, the domain of the resampling process, for example embedded in a camera versus integrated in a high-performance image-editing application, may affect the nature of the desirable characteristics at any particular scale factor.

The approach can also match the quality of resampling to the computational constraints of a device hosting the resampling procedure. For example, a camera may have more limiting computation constraints for computing down-sampled images for presentation on a built-in display than a general purpose computer may have for computing a similar amount of down-sampling.

The approach can also provide a user with controls (e.g., software sliders) that are labeled with intuitively understandable dimensions. For example, rather than having to select a family of interpolation filters (e.g., "cubic") a user can direct manipulate a "sharpness" control or a "processing speed" control.

"Pluggable" (e.g., user or application specified) interpolation filters can be efficiently used, and algorithmic and/or computation issues such as unit sum of the filter samples can be addressed.

The approach supports one-pass sampling of an image subject to an arbitrary affine transformation. That is, the interpolating function is chosen based on the characteristics of the affine transformation.

The number of quantization bins can be chosen to avoid unnecessarily fine quantization, thereby increasing processing speed and reducing the memory required to perform the resamplings.

The separation of fringe computation from the resampling module allows the resampling module to operate with special conditional components dealing with the fringe areas. This can simplify the code for the resampling module, thereby increasing its efficiency and reducing its code size, which can increase its processing speed.

Preprocessing of an image to be resampled into a canonical form before resampling also can reduce the complexity and size of the resampling module, thereby increasing processing speed.

Other features and advantages of the invention are apparent from the following description, and from the claims.

DESCRIPTION OF DRAWINGS

FIGS. 4A, 4B and 4C illustrate a one-dimensional filter.

DESCRIPTION

Figure 1:
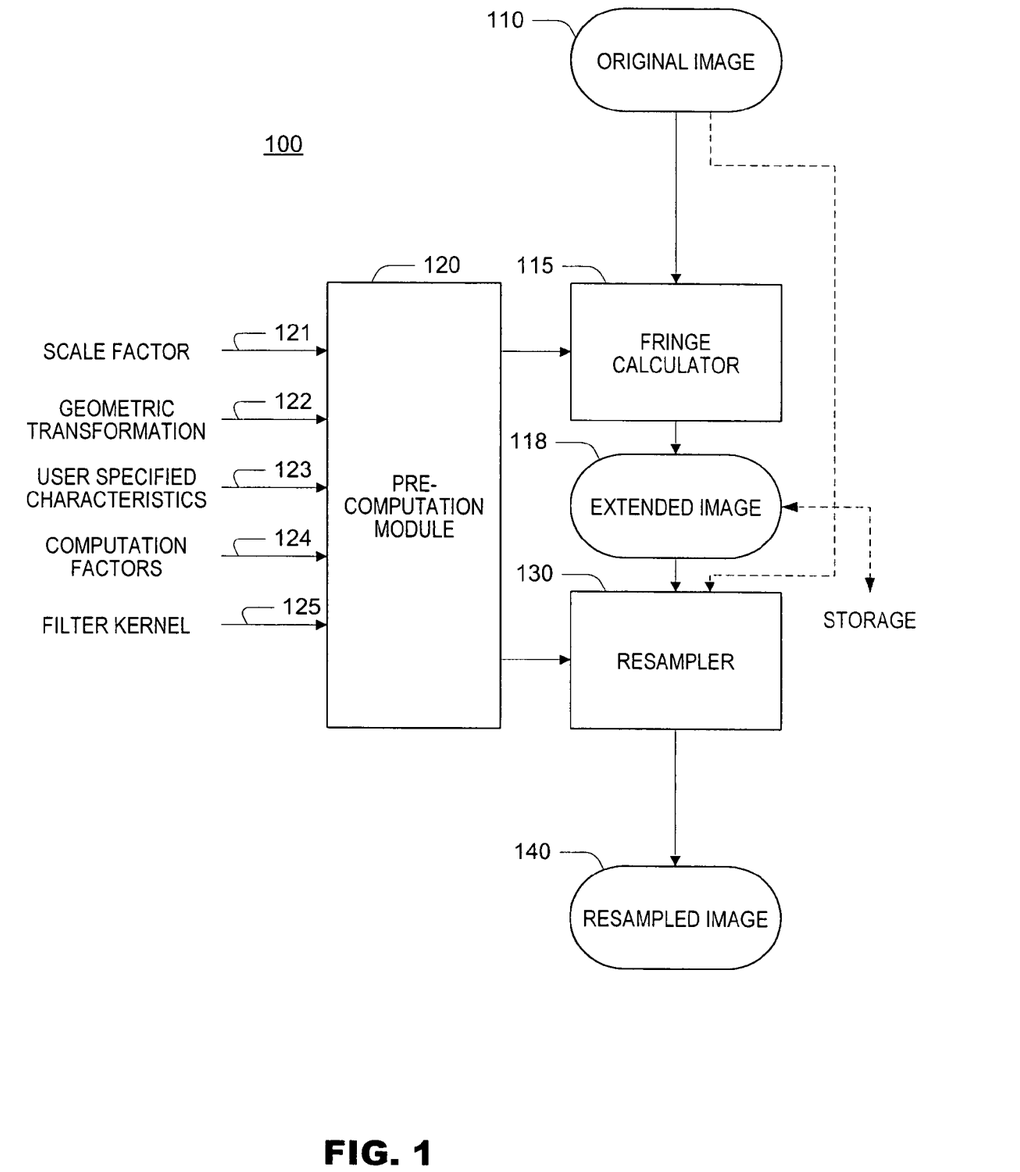
FIG. 1 is a block diagram of a resampling system.

Referring to FIG. 1, a resampling system 100 is used to process an original image 110 producing a resampled image 140. A fringe calculator 115 and a resampler 130 together implement the computation of the resampled image. The fringe calculator and the resampler use precomputed configuration data that is determined by a pre-computation module 120 based on the specific characteristics of the resampling that is to be performed on the original image. As is discussed further below, the fringe calculator accepts the original image 110 and produces an extended image 118 that extends the original image beyond the original edges in a "fringe" area. The pre-computation module 120 determines the extent to which the image has to be extended according to factors such as the size (spatial extent) of filters that are to be applied to the original image and the area of the original image that is to be resampled. The pre-computation module 120 computes data, including a filter, that are used by the resampler 130 in computing the resampled image 140.

The pre-computation module 120 uses a number of inputs in computing the data that it passes to the resampler, including inputs related to one or more of a scale factor 121, a geometric transformation 122 to be applied to the original image, user specified characteristics 123 such as degrees of visual characteristics (for example sharpness) of the resampled image, computation factors 124 such as the processor characteristics of a device hosting resampler 130, and a filter kernel 125 that is to be used for filtering-related computations by the resampler.

The pre-computation module 120, fringe calculator 115, and resampler 130 may be hosted on a variety of different types of computation devices, including on general purpose programmable computers as well as embedded in special-purpose devices such as cameras and portable telephones. Also, the pre-computation module 120, fringe calculator 115, and resampler 130 are not necessarily hosted on the same device. For example, the pre-computation module may be hosted on a general purpose computer, such as on a networked server computer, while the fringe calculator 115 and resampler 130 may be embedded in a special-purpose device. These modules can be implemented using software instructions stored on a computer medium (e.g., computer disk or ROM), or using a combination of special-purpose hardware and software controlled processors. Also, the modules, including the resampler, may be distributed and executed in parallel using a number of processors in order to achieve reduced overall computation time.

Both the original image 110 and its associated extended image 118, as well as the resampled image 140, are spatially sampled images in which a discrete set of pixels represent the image. Each pixel includes data representing the visual characteristics of the image in a region associated with the pixel, typically including a grayscale value for a black-and-white image or including multiple color values for a color image (for exampled values for red, green, and blue components of the image). Each pixel is rendered at a particular region in the image, and a pixel value can be considered to be a spatial sample of an underlying spatially-continuous image at a spatial location associated with that pixel (e.g. at the center of the pixel region). In the discussion below, the pixel locations are typically chosen to lie on a square grid (lattice), although other arrangements, such as rectangular or other geometric grids, can be used.

The resampling implemented by the resampling system 100 supports both magnification (scaling up) as well as minification (scaling down) of images, as well as a more general class of affine geometric transformations. For a fixed pixel separation, magnification generally results in more pixels being produced to represent the image while minification generally results in fewer pixels being produced to represent the image. If the image dimensions are considered fixed, then magnification is related to reducing the pixel separation (up-sampling) while minification is related to increasing the pixel separation (down-sampling).

Determining pixel values for an image at spatial locations not sampled in the original image involves an interpolation of the existing pixel values, which can be implemented as a filtering of the image, and for at least some spatial locations near the edge of the original image involves use of an extrapolation of the image to a fringe area beyond the extent of the original image. Furthermore, when increasing the spatial separation between pixel locations, it is understood that an original image should, in general, be spatially low-pass filtered to avoid an aliasing effect in which high spatial frequency components of the original image may degrade the resulting image if not filtered. Therefore, resampling of the original image involves filtering to address possible aliasing and/or to interpolate pixel values at pixel location in the new image.

Figure 2:
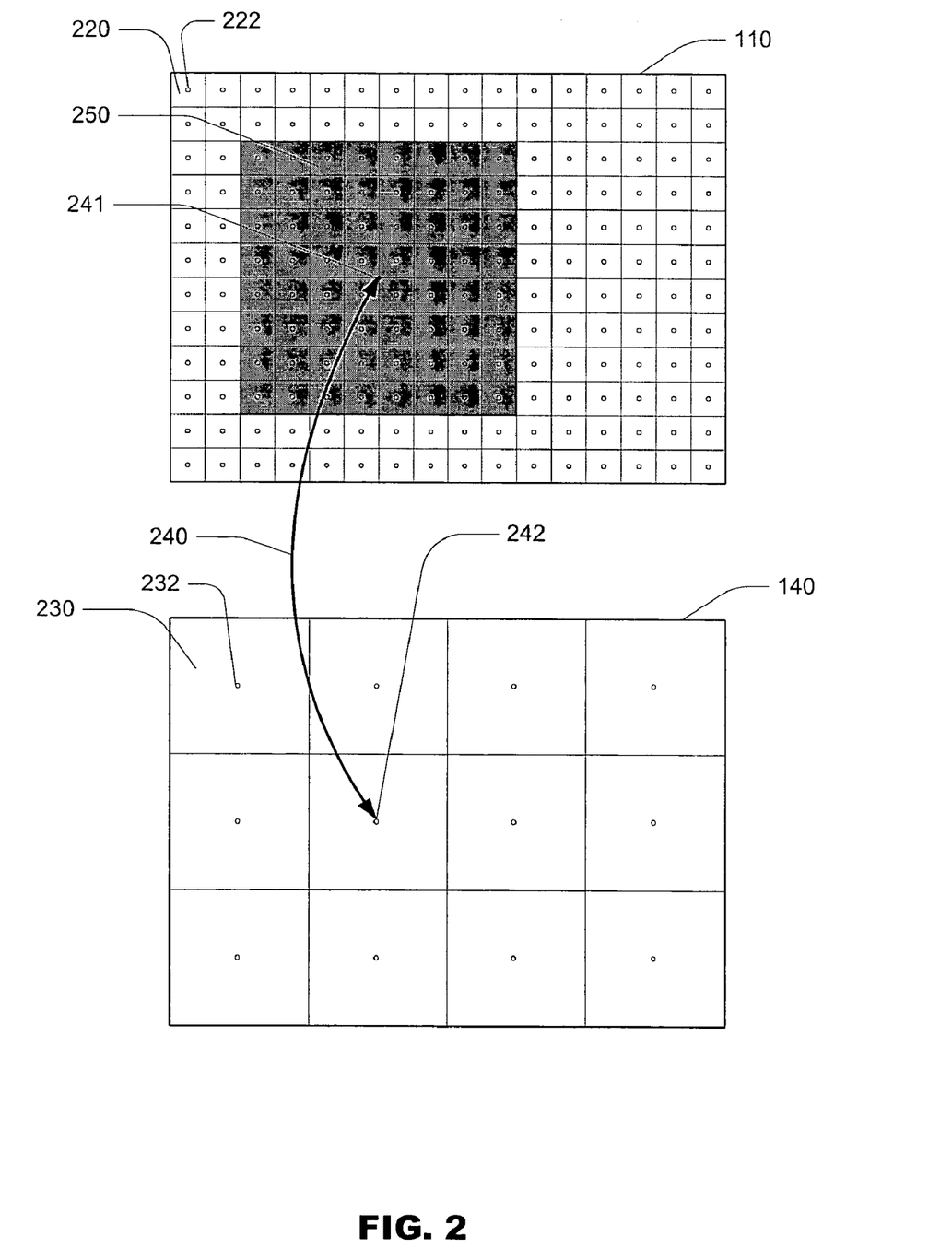
FIG. 2 is an illustration of an image minification.

Referring to FIG. 2, an example of an original image 110 and a resulting resampled image 140 are shown for the case of minification (down-sampling). In this example, the image is being down-sampled by a minification factor of 4 such that the original image has 16×12 pixels and the resampled image has 4×3 pixels. In practice, the actual number of pixels in the original is typically much higher, for example in the range 1600×1200 pixels for camera images. Also, the down-sampling factor may smaller than 4 or greater than 4, for example, a factor of 40 might be used when computing a "thumbnail" image of 40×30 pixels from a 1600×1200 camera image. Also, as is discussed further below, it is not necessary that the scale factor be an integer.

In FIG. 2, each pixel of the original image 110 or the resampled image 140 is associated with a pixel region 220, 230, respectively, and with a particular pixel location 222, 232, respectively, within that region (e.g., the center). In FIG. 2, only the top-left pixel of each of the images have been labeled with reference numerals for clarity. In this example, the entire image area of the original image 110 is represented in the resampled image 140. That is, the image is resampled but otherwise not transformed geometrically or clipped.

Computation of a new pixel value (or each of the multiple separate color values for a color pixel) involves computing a filtered version of the original image at a location in the original image corresponding to the new pixel value. For example, a pixel location 242 in the resampled image corresponds to a location 241 in the original image 110, as is indicated by an arrow 240. Note that the corresponding location 241 in the original image need not correspond to an original pixel location in that image.

In this system, filters that are applied to the original images have finite support. That is, they have a limited spatial range over which they have non-zero values. Computing a filtered value at a particular location in the original image is equivalent to computing a weighted sum of pixel values of the original image at the pixel locations within the support of the filter being applied, with the weights being determined by the shape of filter. In FIG. 2, a spatial extent 250 of a filter being applied to compute the pixel value at location 241 in the original image is illustrated. Various approaches to efficiently computing and approximating the weighted sum are described below.

Figure 3:
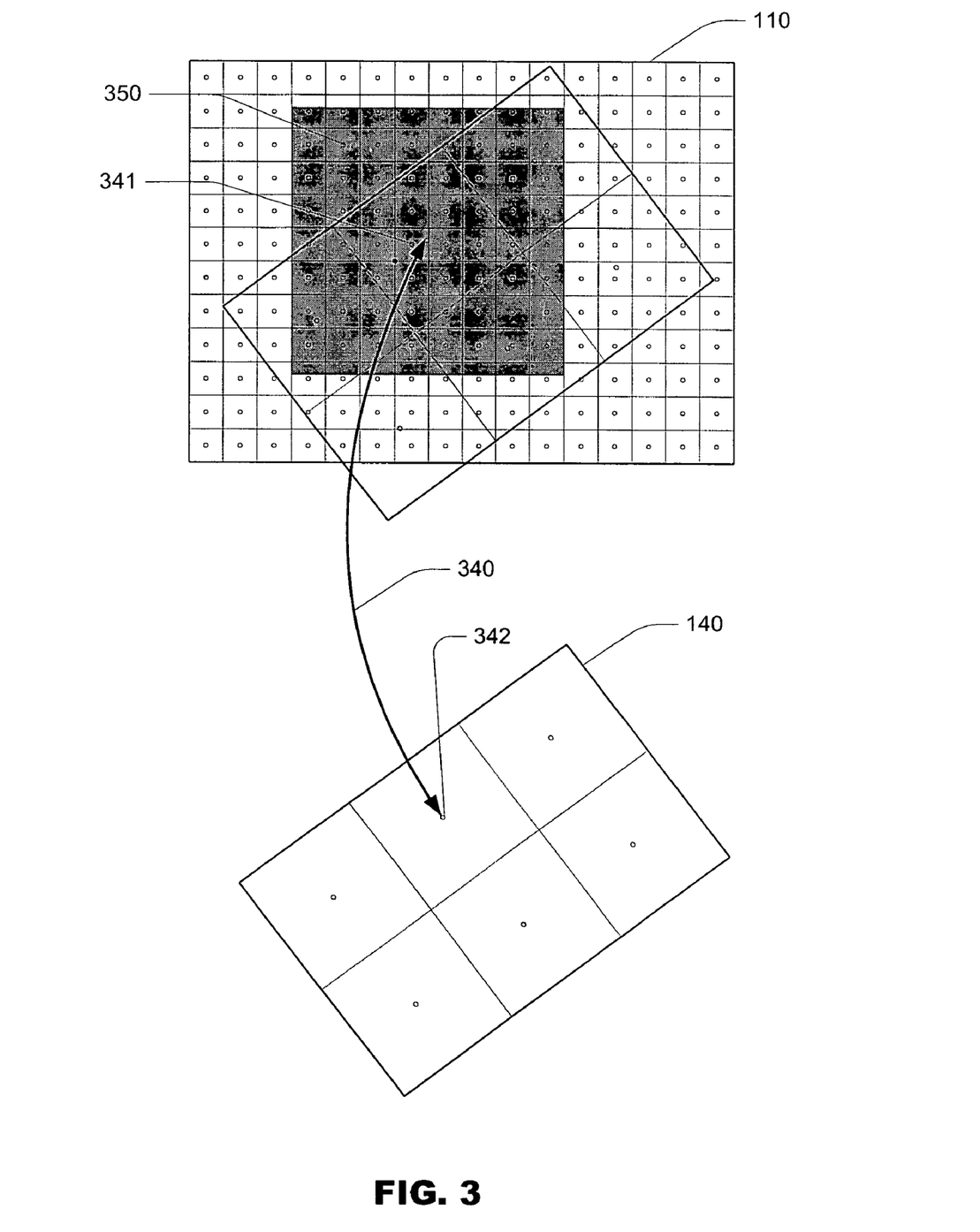
FIG. 3 is an illustration of image resampling with a geometric transformation.

Referring to FIG. 3, in another example, an original image 110 is not only resampled at a new scale pixel spacing, but it is also subject to a geometric transformation, in this example a rotation. As in FIG. 2, each pixel location in the resampled image corresponds to a location in the original image, which is not necessarily at a pixel location of the original image. A representative correspondence is shown between resampled pixel location 342 and an original image location 341 as indicated by an arrow 340.

Resampling system 100 supports a wide range of possible geometric transformations. In particular, rather than (or optionally in addition to) specifying a scalar scale factor 121, a geometric transformation 122 is specified by an affine transformation of the form $\underline{y}=A\underline{x}+b$ where $\underline{y}$ is a (vector) coordinate of a pixel location in the resampled image, $\underline{x}$ is the corresponding location in the original image, and $A$ is a matrix and $b$ is a vector that together define the coordinate transformation. Such an affine transformation can represent various forms of scaling, rotation, skew, etc. The range of coordinate values in the resampled image also can define a clipping of the original image, as is the case illustrated in FIG. 3.

Figure 4A:
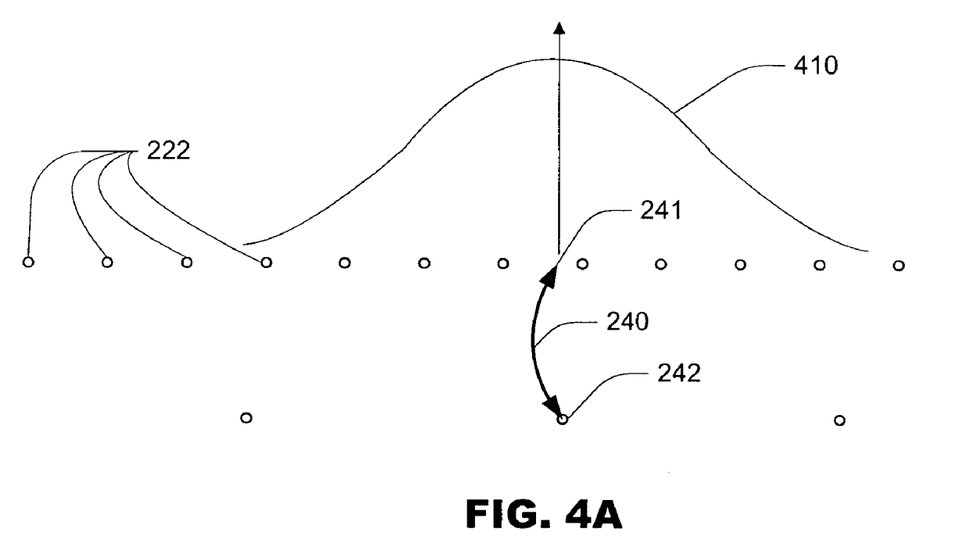
FIG. 4A is an illustration of a continuous filter.

The filtering operation described above is a two-dimensional filtering. For example, in FIG. 3, the support 350 for a filter centered at original coordinates 341 is a two-dimensional region. For clarity of explanation, a one-dimensional version of the filter calculation is addressed in FIGS. 4A and 4B. Referring to FIG. 4A a particular continuously defined filter 410 is illustrated centered at an original location 241. Various forms of filters can be used. The illustrated filter (centered at x=0) has the functional form $f(x)=(2|4x|^3-3|4x|^2+1)/4$, for $x \in [-2,2]$. Calculation of an original image value at an original location 241 that corresponds to a resampled pixel location 242 involves calculating a weighted sum by multiplying pixel values at pixel locations 222 by corresponding non-zero values of the filter 410 centered at location 241. In general, the original location 241 can fall at any point between a pair of pixel locations 241, therefore one approach to calculating the weighted sum is to evaluate the functional form for the filter at each of the needed values.

Figure 4B:
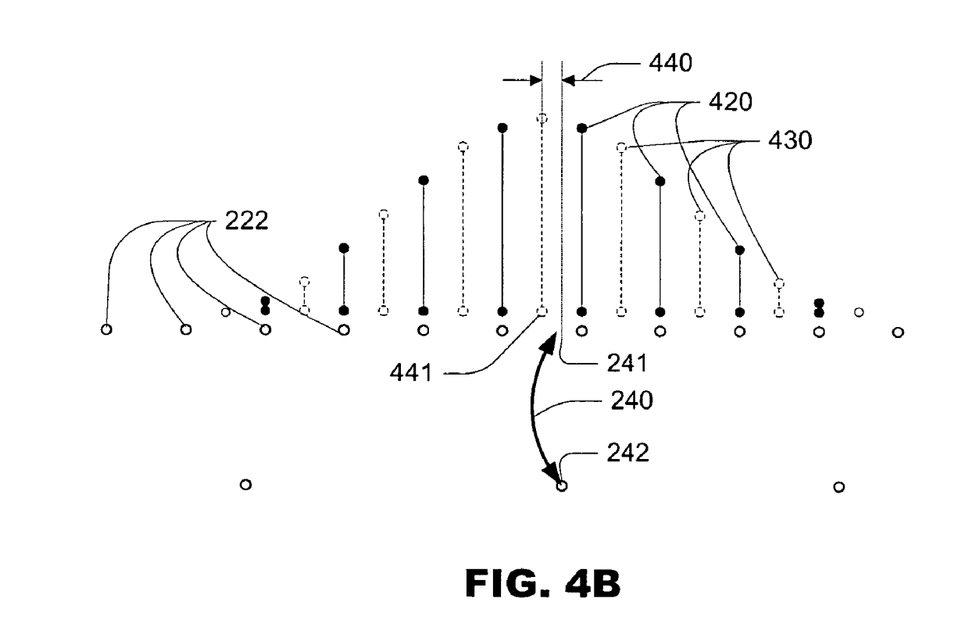
FIG. 4B is an illustration of a spatially quantized filter.

In resampling system 100, particular values of the filter 410 are precomputed and stored for use during the resampling computation, thereby reducing the amount of computation required during resampling, and also removing the specifics of the filter calculation from that resampling computation. In particular, the filter is precomputed for arguments (locations) that are multiples of the original pixel spacing divided by a spatial quantization factor M, which is an integer that is greater than or equal to one. In FIG. 4B, M is illustrated to be 2. These spatially sampled values of the filter are sufficient to compute the weighted sum of original pixel values when the filter is centered exactly at one of the M quantized equally spaced spatial location (bins) in each original pixel spacing. For example, in FIG. 4B, the computation when the original image location 441 is at the midpoint between two pixel locations involves using the filter samples 420, which are illustrated with the filled circles. If the original image location corresponding to a resampled pixel location had been coincident with an original pixel location, then the filter samples 430, which are illustrated with the open circles would have been used.

In FIG. 4B, the desired original image location 241 that corresponds to the resampled pixel location 242 does not fall precisely at one of the quantized spatial locations for which the filter values have been pre-computed. Therefore, the image value at original image location 441, which is the closest of the quantized locations is used instead. The resulting filtered image value is not generally exactly equal to that which would be calculated using the continuous filter at the desired location 241 (as shown in FIG. 4A), however the error (for example measured as a mean squared error, or as a signal-to-noise ratio) can be made relatively smaller by increasing the value of M. The error can also be viewed as a spatial "jitter" 440 in the filtered image in the range of $\pm\frac{1}{2}M$ of the original pixel spacing. That is, the original pixel spacing can be viewed as being divided into M spatial bins, and the value of the original image at a desired original image location in that bin can be computed using a representative (quantized) original image location within that bin.

In order to preserve the unit magnitude of the filter as applied at any of the spatially quantized locations, the sum of the filter values corresponding to any particular spatial bin are renormalized (dividing by a constant) to sum to unity. In FIG. 4B, this corresponds to renormalizing the filter values 420 (the filled circles), and separately renormalizing the filter values 430 (open circles). In general, the M sums of every $M^{th}$ sample of the filter are each renormalized to unity.

Resampling system 100 performs a two dimensional filtering of the original image. In one form of filter used by the system, the filter is separable in that it can be represented as a product $f(x, y) = f_{horiz}(x) \cdot f_{vert}(y)$. For such separable filters, both the horizontal and vertical pixel spacing is divided into bins, and spatially quantized values of each of $f_{horiz}(x)$ and $f_{vert}(y)$ are precomputed. When the same filter is used for both the horizontal and vertical components, and the quantization factor is common, then a single quantized one-dimensional filter is stored. When the image value at a desired original image location is to be computed, each of the coordinates are separately quantized to one of the binned original locations.

Returning to FIG. 1, an output of the filter pre-computation module 120 is a value of the spatial quantization factor M and the corresponding spatially quantized filter values (e.g., 420, 430 in FIG. 3) for the filter to be applied. The filter precomputation makes use of a filter kernel $f(x)$ that is non-zero over a continuous support $[-f_0, f_0]$ of width $N=2f_0$, which is used to form a separable two-dimensional filter as introduced above. A built-in filter kernel can be used, or optionally, a custom filter kernel 125 can be provided to the filter pre-computation module.

For magnification, this filter is used to interpolate the original image values at all pixel locations in the magnified image. The value $M_0$ of the spatial quantization factor is chosen based on factors other than the magnification scale factor. For example, the value is fixed (for example at 10, 32, 33.3, 64, or 100). That is, $N \cdot M_0$ spatially quantized values of the (one-dimensional) filter are precomputed regardless of the magnification scale factor.

For minification, the filter is "stretched" in order to so that the magnified image adheres to the Nyquist rate. For example, for a minification (downsampling) by a minification scale factor of K=4, a continuous filter $g(x)=f(x/K)/K$, which has a width $K \cdot N$ (over a range $[-g_0, g_0]$ for $g_0=K \cdot f_0$), is used. For example, if the original filter kernel $f(x)$ attenuates signals with spatial periods smaller than twice the original pixel spacing (i.e., at the Nyquist frequency for the pixel sampling frequency), then the filter stretched by a factor K will attenuate signals above the Nyquist frequency for the resampled pixel sampling frequency.

In practice, the filter kernel $f(x)$ is not an ideal lowpass filter at the Nyquist frequency, and represents tradeoffs allowing some higher spatial frequencies above the Nyquist frequency to pass while providing for less attenuation, or even amplication, of spatial frequencies below the Nyquist frequency. These trade-offs affect visual characteristics of the resampled image.

For minification, rather than using a spatial quantization factor $M_0$ which would result in $K \cdot N \cdot M_0$ precomputed values of the filter, a smaller value of the spatial quantization factor $M < M_0$ is generally used. The particular value of M is computed in the filter pre-computation module 120 according to one or more factors, such as according to the scale factor. A particular mapping from a minification scale factor K to a spatial quantization factor M(K) has been determined by experimentation with a set of sample images resampled at a number of different scale factors and evaluated both quantitatively according to the error introduced (mean squared error or signal-to-noise ratio) and qualitatively by human subjects. An empirically chosen mapping takes the approximate form $M(K) \approx M_0/K$, which as K grows results in the total number of samples of the filter, $K \cdot N \cdot M(K)$ asymptoting to approximately a limit of $N \cdot M_0$. More specifically, the mapping takes the form of an affine transformation $M(K) = \lceil M_0/K + c \rceil$ for a small constant c less than 1.

For more general geometric transformations, determining the degree of spatial filtering required to avoid the possibility of, or to reduce the effect of, aliasing depends on the specific characteristics of the transformation. For geometric transformations defined by an affine transformation, including rotations and non-uniform scaling in different directions, an equivalent (scalar) scale factor, which is a measure of scale of the geometric transformation, is computed from the transformation matrix, A, of the transformation. The filter pre-computation module determines the equivalent minification scale factor, K, by computing the effect of mapping a unit circle from the original image to an ellipse in the resampled image using the matrix A. Specifically, if the matrix has the form $$A = \begin{bmatrix} a & b \\ c & d \end{bmatrix}$$

then the radii of the ellipse are computed as $$\sqrt{\frac{(a^2+b^2)+(c^2+d^2) \pm \sqrt{4(ac+bd)^2+((a^2+b^2)-(c^2+d^2))^2}}{2}}$$

The equivalent scale factor (inverse of the equivalent minification scale factor K) is then based on the lengths of principal axes of the mapped ellipse. In particular, for a general transformation matrix A, if one of the axes has a length less than one (i.e. minification, down-sampling), then the scale factor is taken to be the minimum of the two. If one or both of the axes have lengths greater than one, the equivalent scale factor is taken to be the average of the two axes. As an alternative and somewhat more conservative approach is to use the minimum scale factor in all cases, but this may result in images that are subjectively overly smooth and/or require unnecessary computation because of a relatively larger filter.

The resampling system 100 supports the use of different filter kernels according to the scale factor (or the measure of scale of a geometric transformation). For example, a parametric kernel $f(x;\theta)$ is used where the parameter value(s) $\theta$ affect the characteristics of the filter such as a spatial cutoff frequency or a degree of attenuation or accentuation (sharpening) of spatial frequencies below the cutoff frequency. The filter-precomputation module chooses the parameter values according to the scale factor. For example, for minification the parameters are chosen to provide generally increasing sharpening for an increasing minification factor. For a magnification by a factor of 2, parameters are chosen to provide some sharpening of the image, with progressively less sharpening as the magnification factor increases until at approximately a magnification factor of 5, the parameters are chosen to provide a smoothing of the image which has a visual effect of reducing the "tiling" appearance of the resampled image.

Examples of filter kernels include the following, each of which is non-zero only on the interval (−2,2):

$$CubicFilter(x) = \begin{cases} (A+2)|x|^3 - (A+3)x^2 + 1 & \text{for } 0 \le |x| < 1 \\ A|x|^3 - 5Ax^2 + 8A|x| - 4A & \text{for } 1 \le |x| < 2 \end{cases}$$

and $$Mitchell(x) = \begin{cases} (12 - 9B - 6C)|x|^3 + (-18 + 12B + 6C)x^2 + (6 - 2B) & \text{for } 0 \le |x| < 1 \\ (-B - 6C)|x|^3 + (6B + 30C)x^2 + (-12B - 48C)|x| + (8B + 24C) & \text{for } 1 \le |x| < 2 \end{cases}$$

As another alternative, the resampling system 100 supports use of different filter kernels for different ranges of scale factor.

The resampling system 100 also optionally accepts user-specified characteristics 123 that are used to determine the characteristics of the filter to be used in resampling. In one example of such user-specified characteristics, a user inputs a desired degree of "sharpness," for example by adjusting a slider in a graphical user interface. This degree of sharpness is then used to modify parameter values of the filter kernel (either augmenting the mapping from scale factor to parameter values or replacing the mapping) to provide increased response to high spatial frequency components. Other examples of possible user-specified characteristics include "ringing", which affects the degree of spatial aliasing, and "quality".

The resampling system 100 optionally takes account of computation factors 124 in determining data it provides the resampler. For example, the selection of the spatial quantization factor M determines the number of filter samples that will be used by the resampler. One example of a computation factor is the cache size of the target processor. The spatial quantization factor is then chosen so that the number of spatially quantized samples is not so large as to result in poor cache behavior. Other computation factors that can be used include the number of floating point registers and the computation speed of the target processor, and the precision and representation of the pixel values (e.g., 8 vs. 16 vs. 32 bits, fixed point/integer vs. floating point).

The resampling system optionally uses a cascade filtering approach for large degrees of minification. For a minification factor K, the resampling is essentially carried out in two stages. First, a minification by an integer factor $K_1 < K$ is carried out using a first filter kernel $f_1(x/f_1)/K_1$, followed by a minification by a factor $K_2 = K/K_1$ using a second filter. The first filter is chosen to enable efficient computation, for example, having a constant value within its support (e.g., a rectangular window filter). The second filter can be parameterized, as described above, and the parameter values are optionally chosen so that the cascade of the two filtering operations has desired effect. For example, the first filter may attenuate the higher spatial frequencies, while the second filter may compensate for this attenuation through the appropriate setting of its parameters. The calculation of these filters can be performed in the frequency domain to achieve a desired (e.g., flat) spatial frequency response.

Figure 4C:
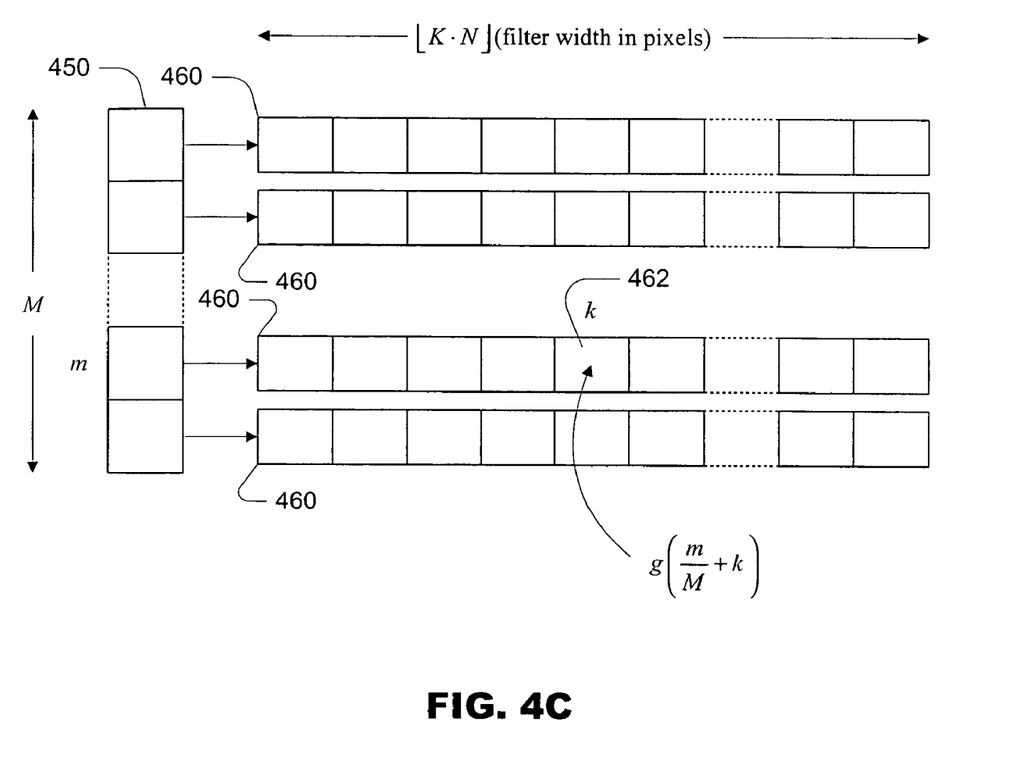
FIG. 4C is a data structure for storing values of the quantized filter.

Referring to FIG. 4C, a data structure that holds the K·N·M values of the filter $g(x)=f(x/K)/K$ includes an array 450 of M elements, each of which points to an array 460 of $\lfloor K \cdot N \rfloor$ elements, where as discussed above K·N corresponds to the length of the filter in units of pixels. Each of these arrays holds samples of the filter with unit pixel spacing, but with a different fractional pixel location of the center of the filter. That is, if we consider the $m^{th}$ row in array 450, and the $k^{th}$ entry 462 in the corresponding array 460, that entry holds the value g(m/M+k), where k can range from $-\lfloor g_0 \rfloor$ to $\lfloor g_0 \rfloor -1$ across the array. When applying the filter at a particular fractional pixel location, for each dimension the samples of the filter in one of the arrays 460 are used, and can therefore be accessed efficiently.

In summary of the above description, the filter pre-processing module 120 computes data that include: the filter spatial quantization factor M, the total integer filter size, which is the size of the filter kernel for the magnification case and a scaling up of that size for the minification case, and the filter samples spatially quantized according to the spatial quantization factor.

The data also characterizes the quantized locations in the original image that correspond to each of the resampled pixel locations. For each scan line of the resampled image, the filter pre-processing module 120 computes a location corresponding to the first pixel in the scan line in the original image 110. The module also computes the separation of pixels in the scanline which includes a component in each of the dimensions of the original image. This enables the resampler 130 to incrementally step through the original image in computing a scanline of pixels of the resampled image.

To further reduce the computation that is required by the resampler 130 during the resampling computation, the computed location that is associated with a pixel location in the resampled image identifies the top-left corner pixel in the support for the filter, as well as an index identifying which of the series of (the every $M^{th}$) samples of the filter are to be used. These computed locations are stored in a data structure that is passed to the resampler. To further reduce computation during the resampling process, this top-left location is optionally represented as a memory address. The computation of this top-left pixel location in the support takes account of the conventions used to associate pixel coordinates with the continuation pixel regions that support the coordinates. For example, one convention is that a pixel at (integer) coordinates (i, j) is associated with a pixel region which is centered at (i, j) and has spatial extent $[i-\frac{1}{2}, i+\frac{1}{2}] \times [j-\frac{1}{2}, j+\frac{1}{2}]$. Another convention is that a pixel at coordinates (i, j) is associated with a pixel region which is centered at $(i+\frac{1}{2}, j+\frac{1}{2})$ and a pixel region $[i, i+1] \times [j, j+1]$. The computation maps the pixel centers between the original and resampled images and computes the pixel coordinates according to the convention used for each of the images.

Referring back to FIG. 1, the pre-processing module 120 determines the extent to which the fringe calculator 115 is to extend the original image 110 to form the extended image 118. As described above, the pre-computation module 120 determines the filter that is to be applied to the original image and the set of (fractional pixel) locations in the original image 110 at which the filter is to be applied. In general, some of the original locations at which the filter is to be applied may be near the edge of the original image, and therefore the filter centered at the original image location would extend beyond the edge of the original image. One approach to handling this situation would be for the resampler 130 to test for this condition and not include the original pixel locations that are not within the original area of original image 110. This system uses an alternative approach in which the pre-computation module 120 determines the maximum size of the fringe that is necessary such that when the filter is applied by the resampler 130 at any of the required original image locations. All the pixel values to which the filter is applied then fall within the area of the extended image 118 and tests related to the edge of the image 110 are not necessary. The fringe pixel values are determined from the original image itself by replicating the pixel values at the edge of the image. In this way, the resampler does not have to incorporated tests related to the filter extending beyond the edge of the original image, or special-purpose code for filtering near the edge of the original image. Note that the size of the fringe can depend on a number of factors, including the degree of magnification which affects the size of the filter, and the geometric transformation of the original image. Also, alternative fringe computations can be used, for example, by setting the fringe to a fixed color or reflecting the image into the fringe area, extrapolation of the image (eg. linear extrapolation, or using a user-specified value or function.

As part of the fringe calculator 115 the original image is stored in a canonical form (e.g. interlaced color values represented as 32-bit integers). For example, the image is decompressed (for example in the case of a JPEG image) and the pixel values are arranged in a predetermined order in memory.

In an optional mode, which is illustrated in FIG. 1 by the broken line from the original image 110 to the resampler 130, the fringe calculator is not required and the original image includes a sufficient fringe area. For example, if a large image is being resampled in a series of tiles that together form the entire original image, interior tiles (tiles that are not at the edge of the image) might have sufficient fringe to not require computation of an extended image 118. On the other hand, tiles at or near the edge of the original image may require allocation of memory for and/or computation for a fringe image prior to processing by the resampler.

In another optional mode, the fringe calculator does not necessarily allocate memory for a second copy of the original image. Rather, the pre-processing module 120 determines the minimum required size of the required fringe, and provides that information the module that supplies the original image 110. The original image is then stored within a larger memory area, and the fringe calculator 115 populates the pixel values in the required fringe area with the already allocated memory. In this way, a second memory area does not need to be allocated for the extended image.

Figure 5:
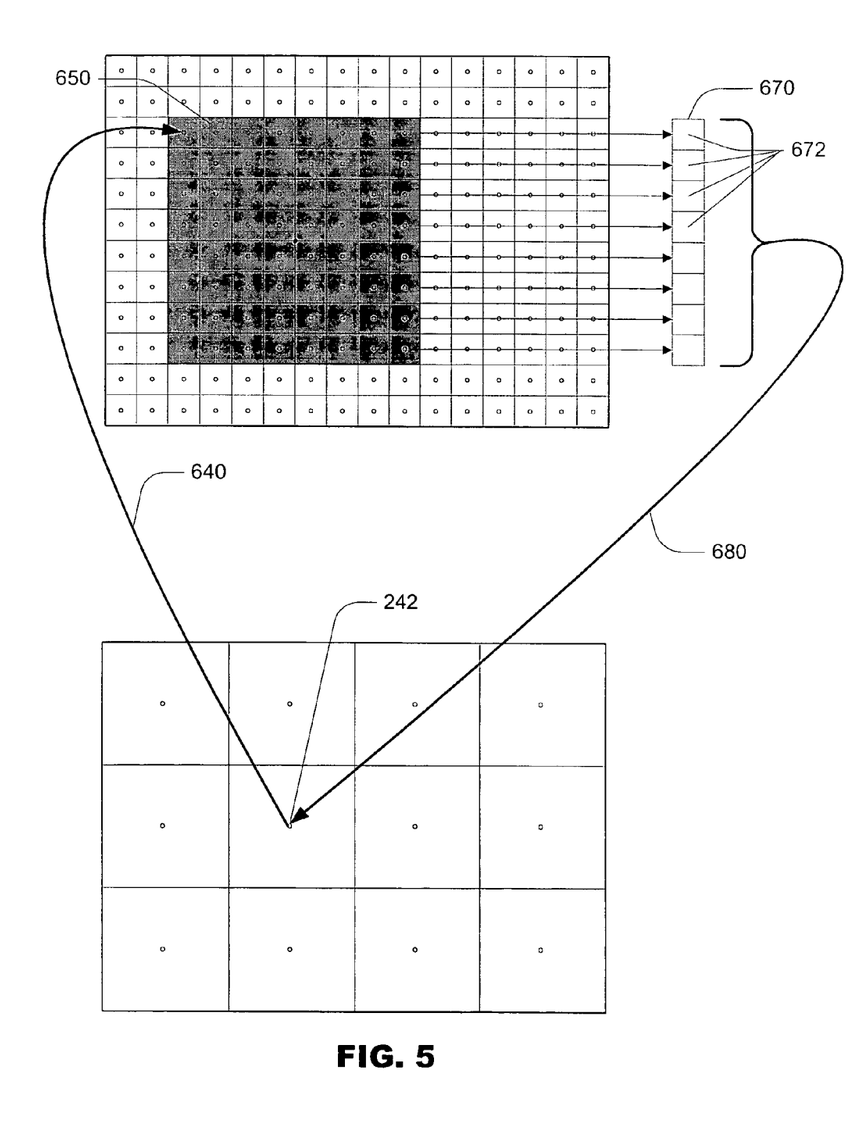
FIG. 5 is a diagram that illustrates a two-pass filtering computation.

Referring to FIG. 6, the resampler 130 loops over the resampled pixels, and for each pixel applies the filter according to the stored data that identifies the top-left pixel of the original image and the subset of the filter samples that are to be applied. This identification of the top-left original pixel is represented by an arrow 640 that relates a representative resampled pixel 242 with a top-left pixel 650. The separable filter calculation is applied for each pixel in two passes. In the first pass, the one dimensional filter is applied to each row of the original image to produce a partial row-sum result 672 for that row. The preprocessed original image is stored so that the rows of pixel values are contiguous so this pass uses relatively localized memory accesses. After all the row sums have been computed, the one-dimensional filter is applied to the column 670 of the computed row-sums 672 in a second pass. This final result then provides the resampled pixel value for the pixel, as is illustrated by an arrow 680. In the case of color images, each of the color values are computed in the same way, either together, or as a loop over the different colors. As introduced above, the image includes a fringe of valid pixel values so that the computation is applied in the same way for pixels near the edge of the original image.

In one implementation of this separable filtering approach, the pre-computation module computes different data representations of the filter applied to the rows and the filter applied to the column of partial results. The row filter is computed as an array of integer values. For example, 12-bit values are used. If the image uses 8-bit values, each term in the row sum uses 20 bits. The length of the row filter is also extended to a data access boundary for the processor being used to increase data access efficiency. For example, if the processor uses 8-byte (64-bit), the row filter is extended to a multiple of 8 bytes for example by zero padding. The column filter is represented using floating point values, and the column sum is accumulated as a floating point value, thereby limiting dynamic range limitations.

In an alternative implementation, or as an optional calculation, a non-separable filter is used by the resampler. The computation is similar to that described above in that each resampled pixel value is computed in turn. However, the two-dimensional weighted sum is computed in one pass, iterating along each row and then from row to row in the support of the filter.

Alternative versions of the system can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or screen for displaying information to the user and a keyboard and a pointing device such as a mouse or a trackball by which the user can provide input to the computer system. The computer system can be programmed to provide a graphical user interface through which computer programs interact with users.

It is to be understood that the foregoing description is intended to illustrate and not to limit the scope of the invention, which is defined by the scope of the appended claims. Other embodiments are within the scope of the following claims.

What is claimed is:

1. A method for resampling a first image sampled on a first sample grid comprising:
    computing a filter for applying to the first image, including computing a spatially quantized representation of the filter wherein a degree of spatial quantization of the filter depends on one or more factors including a measure of scale relating the first sample grid and a desired sample grid; and
    storing the spatially quantized representation of the filter in a data structure comprising a location array that includes a plurality of elements representing different fractional pixel locations associated with first sample grid that are based on a spatial quantization factor, wherein each element of the location array points to a sample array of filter values.

2. The method of claim 1 further comprising:
    computing a desired image sampled on the desired sample grid, including computing samples of the desired image according to an application of the spatially quantized representation of the filter to the first image.

3. The method of claim 1 further comprising:
    accepting data characterizing a geometric transformation relating the first sample grid and the desired sample grid; and
    computing the measure of scale from the data characterizing the geometric transformation.

4. The method of claim 1 wherein computing the filter includes selecting the number of spatial samples of the spatially quantized representation of the filter.

5. The method of claim 4 wherein computing the spatially quantized representation of the filter includes computing values of the filter each associated with one of a number of equal spatial domains of the filter.

6. The method of claim 1 wherein computing the filter for applying to the first image includes selecting a parametric family of filters.

7. The method of claim 6 wherein computing the filter for applying to the first image includes determining parameter values for the filter.

8. The method of claim 7 wherein determining the parameter values for the filter includes computing the parameters values based on factors including the measure of scale.

9. The method of claim 1 further comprising accepting a user input specifying a characteristic of the resampling, and using the user input in the computing of the filter for applying to the first image.

10. The method of claim 9 wherein accepting the user input includes accepting an input related to a characteristic of the desired image.

11. The method of claim 10 wherein the characteristic of the desired image includes a visual characteristic of the desired image.

12. The method of claim 9 wherein accepting the user input includes accepting an input related to a processing characteristic for the resampling.

13. The method of claim 12 wherein the input related to the processing characteristic includes an input related to a processing speed.

14. The method of claim 1 wherein the degree of spatial quantization of the filter depends on factors that further include characteristics of a computation device for performing the resampling.

15. The method of claim 14 wherein the characteristics of the computational device include a memory size characteristic.

16. The method of claim 15 wherein the memory size characteristic includes a cache memory size.

17. The method of claim 14 wherein the characteristics of the computational device include a processor characteristic.

18. A method for resampling a first image sampled on a first sample grid comprising:
    accepting data characterizing a geometric transformation relating the first sample grid and a desired sample grid;
    determining a measure of scale relating the first sample grid and the desired sample grid from the data characterizing the geometric transformation;
    computing a filter for applying to the first image, including selecting characteristics of the filter according to the determined measure of scale and computing a spatially quantized representation of the filter, wherein a degree of spatial quantization of the filter depends on the determined measure of scale; and
    storing the spatially quantized representation of the filter in a data structure comprising a location array that includes a plurality of elements representing different fractional pixel locations associated with first sample grid that are based on a spatial quantization factor, wherein each element of the location array points to a sample array of filter values.

19. The method of claim 18 wherein the filter is a member of a parametric family of filters and selecting the characteristics of the filter includes selecting parameter values for the filter according to the determined measure of scale.

20. The method of claim 18 wherein the data characterizing the geometric transformation includes data characterizing an affine transformation.

21. The method of claim 18 wherein the data characterizing the geometric transformation includes a minification factor.

22. The method of claim 18 wherein the data characterizing the geometric transformation includes a magnification factor.

23. Software stored on a computer-readable medium comprising instructions for causing a computer to:
    compute a filter for applying in resampling to a first image sampled on a first sample grid, including computing a spatially quantized representation of the filter wherein a degree of spatial quantization of the filter depends on one or more factors including a measure of scale relating the first sample grid and a desired sample grid; and
    store the spatially quantized representation of the filter in a data structure comprising a location array that includes a plurality of elements representing different fractional pixel locations associated with first sample grid that are based on a spatial quantization factor, wherein each element of the location array points to a sample array of filter values.

24. The software of claim 23 wherein the instructions further cause the computer to:
    accept data characterizing a geometric transformation relating the first sample grid and the desired sample grid; and
    compute the measure of scale from the data characterizing the geometric transformation.

25. The software of claim 23 wherein computing the filter includes selecting the number of spatial samples of the spatially quantized representation of the filter.

26. The software of claim 25 wherein computing the spatially quantized representation of the filter includes computing values of the filter each associated with one of a number of equal spatial domains of the filter.

27. The software of claim 23 wherein computing the filter for applying to the first image includes selecting a parametric family of filters.

28. The software of claim 27 wherein computing the filter for applying to the first image includes determining parameter values for the filter.

29. The software of claim 28 wherein determining the parameter values for the filter includes computing the parameter values based on factors including the measure of scale.

30. The software of claim 23 further comprising accepting a user input specifying a characteristic of the resampling, and using the user input in the computing of the filter for applying to the first image.

31. The software of claim 30 wherein accepting the user input includes accepting an input related to a characteristic of the desired image.

32. The software of claim 31 wherein the characteristic of the desired image includes a visual characteristic of the desired image.

33. The software of claim 30 wherein accepting the user input includes accepting an input related to a processing characteristic for the resampling.

34. The software of claim 33 wherein the input related to the processing characteristic includes an input related to a processing speed.

35. The software of claim 23 wherein the degree of spatial quantization of the filter depends on factors that further include characteristics of a computation device for performing the resampling.

36. The software of claim 35 wherein the characteristics of the computational device include a memory size characteristic.

37. The software of claim 36 wherein the memory size characteristic includes a cache memory size.

38. The software of claim 35 wherein the characteristics of the computational device include a processor characteristic.

39. A system for resampling a first image sampled on a first sample grid comprising:
  means for computing a filter for applying to the first image, including means for computing a spatially quantized representation of the filter wherein a degree of spatial quantization of the filter depends on one or more factors including a measure of scale relating the first sample grid and a desired sample grid; and
  means for storing the spatially quantized representation of the filter in a data structure comprising a location array that includes a plurality of elements representing different fractional pixel locations associated with first sample grid that are based on a spatial quantization factor, wherein each element of the location array points to a sample array of filter values.

40. The system of claim 39, further comprising:
  means for accepting data characterizing a geometric transformation relating the first sample grid and the desired sample grid; and
  means for computing the measure of scale from the data characterizing the geometric transformation.

41. The system of claim 39, wherein the means for computing the filter further comprises means for selecting the number of spatial samples of the spatially quantized representation of the filter.

42. The system of claim 41, wherein the means for computing the spatially quantized representation of the filter further comprises means for computing values of the filter, each associated with one of a number of equal spatial domains of the filter.

43. The system of claim 39, wherein the means for computing the filter for applying to the first image further comprises means for selecting a parametric family of filters.

44. The system of claim 43, wherein the means for computing the filter for applying to the first image further comprises means for determining parameter values for the filter.

45. The system of claim 44, wherein the means for determining the parameter values for the filter is configured to compute the parameter values based on factors including the measure of scale.

46. The system of claim 39, further comprising:
  means for accepting a user input specifying a characteristic of the resampling and means for using the user input in the computing of the filter for applying to the first image.

47. The system of claim 46, wherein the means for accepting the user input is configured to accept an input related to a characteristic of the desired image.

48. The system of claim 47, wherein the characteristic of the desired image includes a visual characteristic of the desired image.

49. The system of claim 46, wherein the means for accepting the user input is configured to accept an input related to a processing characteristic for the resampling.

50. The system of claim 49, wherein the input related to the processing characteristic includes an input related to a processing speed.

51. The system of claim 39, wherein the degree of spatial quantization of the filter depends on factors that further include characteristics of a computation device for performing the resampling.

52. The system of claim 51, wherein the characteristics of the computational device include a memory size characteristic.

53. The system of claim 52, wherein the memory size characteristic includes a cache memory size.

54. The system of claim 51, wherein the characteristics of the computational device include a processor characteristic.

55. Software stored on a computer-readable medium comprising instructions for causing a computer to:
  accept data characterizing a geometric transformation relating a first sample grid for a first image and a desired sample grid;
  determine a measure of scale relating the first sample grid and the desired sample grid from the data characterizing the geometric transformation;
  compute a filter for applying to the first image, including selecting characteristics of the filter according to the determined measure of scale and compute a spatially quantized representation of the filter, wherein a degree of spatial quantization of the filter depends on the determined measure of scale; and
  store the spatially quantized representation of the filter in a data structure comprising a location array that includes a plurality of elements representing different fractional pixel locations associated with first sample grid that are based on a spatial quantization factor, wherein each element of the location array points to a sample array of filter values.

56. The software of claim 55, wherein the filter is a member of a parametric family of filters and selecting characteristics of the filter includes selecting parameter values for the filter according to the determined measure of scale.

57. The software of claim 55, wherein the data characterizing the geometric transformation includes data characterizing an affine transformation.

58. The software of claim 55, wherein the data characterizing the geometric transformation includes a minification factor.

59. The software of claim 55, wherein the data characterizing the geometric transformation includes a magnification factor.

60. A system for resampling a first image sampled on a first sample grid comprising:

means for accepting data characterizing a geometric transformation relating the first sample grid and the desired sample grid;

means for determining a measure of scale relating the first sample grid and a desired sample grid from the data characterizing the geometric transformation;

means for computing a filter for applying to the first image, including means for selecting characteristics of the filter according to the determined measure of scale and computing a spatially quantized representation of the filter, wherein a degree of spatial quantization of the filter depends on the determined measure of scale; and means for storing the spatially quantized representation of the filter in a data structure comprising a location array that includes a plurality of elements representing different fractional pixel locations associated with first sample grid that are based on a spatial quantization factor, wherein each element of the location array points to a sample array of filter values.

61. The system of claim 60, wherein the filter is a member of a parametric family of filters and the means for selecting characteristics of the filter is configured to select parameter values for the filter according to the determined measure of scale.

62. The system of claim 44, wherein the data characterizing the geometric transformation includes data characterizing an affine transformation.

63. The system of claim 60, wherein the data characterizing the geometric transformation includes a minification factor.

64. The system of claim 60, wherein the data characterizing the geometric transformation includes a magnification factor.

* * * * *

UNITED STATES PATENT AND TRADEMARK OFFICE
CERTIFICATE OF CORRECTION

PATENT NO.        : 7,437,018 B1
APPLICATION NO.   : 10/714514
DATED             : October 14, 2008
INVENTOR(S)       : Sohrab Amirghodsi Page 1 of 1

It is certified that error appears in the above-identified patent and that said Letters Patent is hereby corrected as shown below:

In the Specification:
    column 1, line 10:
        delete "application", and replace with --applications--

Claim 1:
    column 13, line 20:
        delete "with", and replace with --with the--

Claim 18:
    column 14, line 28:
        delete "with", and replace with --with the--

Claim 23:
    column 14, line 54:
        delete "with", and replace with --with the--

Claim 39:
    column 15, line 52:
        delete "with", and replace with --with the--

Claim 55:
    column 16, line 60:
        delete "with", and replace with --with the--

Claim 60:
    column 18, line 6:
        delete "with", and replace with --with the--

Signed and Sealed this
Twenty-seventh Day of November, 2012

David J. Kappos
*Director of the United States Patent and Trademark Office*